(12) United States Patent
Yang et al.

(10) Patent No.: US 6,702,918 B2
(45) Date of Patent: Mar. 9, 2004

(54) INTERMITTENT MATERIAL FEED TYPE VARIABLE-LAMINATION RAPID PROTOTYPING PROCESS AND APPARATUS USING LINEAR THERMAL CUTTING SYSTEM

(75) Inventors: Dong-Yol Yang, Daejon (KR); Dong-Gyu Ahn, Daejon (KR); Sang-Ho Lee, Daejon (KR); Hong-Seok Choi, Daejon (KR); Seung-Kyo Park, Daejon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 25 days.

(21) Appl. No.: 10/191,954

(22) Filed: Jul. 8, 2002

(65) Prior Publication Data

US 2003/0006001 A1 Jan. 9, 2003

(30) Foreign Application Priority Data

Jul. 6, 2001 (KR) .................................. 2001-0040212

(51) Int. Cl.⁷ ............................................. B32B 31/04
(52) U.S. Cl. .................. 156/263; 156/272.8; 156/352; 156/353; 156/364; 156/368; 156/517; 156/256; 156/523; 156/563; 156/566; 156/570; 271/126; 271/160
(58) Field of Search ................... 156/263, 264, 156/272.8, 352, 353, 356, 362, 363, 364, 368, 367, 556, 558, 559, 562, 379.8, 512, 513, 517, 523, 529, 563, 566, 569, 570, 256; 271/126; 270/160

(56) References Cited

U.S. PATENT DOCUMENTS

| | | | |
|---|---|---|---|
| 3,901,110 A | | 8/1975 | Priestly ........................ 83/171 |
| 4,007,925 A | * | 2/1977 | DeRyke et al. .............. 271/160 |
| 4,064,301 A | | 12/1977 | Howard ....................... 428/151 |
| 4,699,032 A | | 10/1987 | Clark, III ..................... 83/171 |
| 4,752,352 A | | 6/1988 | Feygin ......................... 156/630 |
| 5,172,532 A | | 12/1992 | Gibbar, Jr. ............... 52/309.12 |
| 5,943,775 A | | 8/1999 | Lanahan et al. .......... 29/897.32 |
| 6,056,843 A | * | 5/2000 | Morita et al. ............... 156/250 |
| 6,165,307 A | * | 12/2000 | Fair et al. ................... 156/264 |
| 6,506,477 B1 | * | 1/2003 | Ueda et al. ................. 428/195 |

OTHER PUBLICATIONS

Yang, D. et al., Variable Lamination Manufacturing (VLM) Process and Apparatus, *U.S. Patent Publication No. 2001/0040003 A1*, published Nov. 15, 2001, application No. 09/804,175, filed Mar. 12, 2001.

* cited by examiner

*Primary Examiner*—Linda Gray
(74) *Attorney, Agent, or Firm*—Seed Intellectual Property Law Group PLLC

(57) ABSTRACT

A rapid prototyping process and apparatus that provides an intermittent material feed type variable-lamination rapid prototyping using a linear thermal cutting system, wherein intermittently fed materials are cut to have variable lengths, widths, and lateral gradients with the 4-axis control-type linear thermal cutting system controlled by a computer, and based on cutting operation data generated in the computer.

14 Claims, 4 Drawing Sheets

INTERMITTENT MATERIAL FEED TYPE VARIABLE-LAMINATION RAPID PROTOTYPING PROCESS AND APPARATUS USING LINEAR THERMAL CUTTING SYSTEM

BACKGROUND OF THE INVENTION

1. Field of the Invention

The present invention relates to a rapid prototyping process and an apparatus for performing the same, and more particularly, to an intermittent material feed type variable-lamination rapid prototyping process and apparatus using a linear thermal cutting system, wherein sheet materials are intermittently fed and then processed based on cutting operation data, the materials are precisely cut and processed into unit shaped-sheets by using a 4 degree-of-freedom linear thermal cutting system that can be controlled in respective axis directions during the processing, and the unit shaped-sheets are sequentially laminated and bonded one above another, thereby prototyping a precise product in a relatively short period of time.

2. Description of the Related Art

Generally, a rapid prototyping technology means a process of directly forming materials such as pulp sheets, wax, synthetic resin and metal into a 3-dimensional prototype or mold based on 3-dimensional computer aided design (CAD) data. Recently, the materials for use in the process are expanded to metal powder, metal wires and the like.

The existing rapid prototyping processes are largely classified into two types: a curing process of forming a 3-dimensional shape by irradiating and curing a liquid material with a laser beam, and a process of forming a desired shape by bonding granular or stratified solid materials. Stereo lithography (hereinafter, abbreviated as "SLA") falling within the former type is a process of continuously laminating layers one by one by selectively irradiating and curing a liquid photo polymer contained in a container with the laser beam.

The stereo lithography is further divided into two types: a process of locally irradiating the material with the laser beam, and a process of irradiating one of the layers at one time using an ultraviolet lamp. The stereo lithography is a commercial rapid prototyping process that is conventionally used.

However, there is a problem in that the photo polymer solidified during the process is contracted upon curing thereof and thus a warp phenomenon occurs. Further, if a part having any projection is manufactured, an additional support is required for prevention of sagging of the projection of the solidified photo polymer. Moreover, since the photo polymer used as the material has a relatively low strength, there is a problem in that it has a limitation on use for functional products.

Meanwhile, among the conventional rapid prototyping processes, there is a process of forming a desired shape by using powder materials. This process is divided into a selective laser sintering process and a 3-dimensional printing process.

According to the selective laser sintering process, a product is manufactured by applying a synthetic resin powder material and irradiating it with the laser beam so that the powder can be bound. Furthermore, a metallic part or mold can be manufactured by applying iron powder onto a surface made of the synthetic resin.

However, since the manufacture of the metallic part or mold requires a post-treatment such as sintering and involves the contraction resulting from thermal deformation during the post-treatment, there is a problem in that manufacturing accuracy is generally deteriorated.

According to the 3-dimensional printing process, a product is manufactured by selectively sprinkling a liquid binder on applied powder. As for the powder, ceramic powder for use in investment casting and a starch-based powder material are utilized. This process also inevitably requires a post-treatment for increasing the density and strength of the product and has a problem in that the contraction due to the thermal deformation occurs.

In addition, as for further rapid prototyping processes, there are a laminated object manufacturing process (LOM) and a fused deposition manufacturing process (FDM). According to the laminated object manufacturing process, a product is manufactured by repeating operations of bonding laminated pulp sheets using heated rollers and then cutting the bonded pulp sheets using a laser.

Although this process has an advantage in that operating costs can be reduced owing to the use of the pulp sheets, there is a problem in that it takes relatively much time to separate the manufactured product.

According to the fused deposition manufacturing process, a product is manufactured by fusing a filament-type synthetic resin material by passing it through a heated nozzle similar to an extruding die and then bonding the fused material. However, there is a problem in that surface roughness of the product is relatively deteriorated due to the use of the filament-type material.

BRIEF SUMMARY OF THE INVENTION

The disclosed embodiments of the present invention are directed to an intermittent material feed type variable-lamination rapid prototyping process and apparatus using a linear thermal cutting system, wherein a complicated product can be more rapidly and precisely manufactured by controlling variable widths and lengths of materials during processing of the materials.

The embodiments of the invention provide an intermittent material feed type variable-lamination rapid prototyping process and apparatus using a linear thermal cutting system, wherein a plurality of materials having different thicknesses can be intermittently fed.

The foregoing is obtained by an intermittent material feed type variable-lamination rapid prototyping apparatus using a linear thermal cutting system, comprising a collapsible leg with elastic bodies installed at link-connected intersections for supporting sheet materials stacked on the collapsible leg; a friction roller for feeding the supported materials onto a conveyor belt engaged with and simultaneously driven with the friction roller through gears in a state where the friction roller is in pressure contact with one of the sheet materials; said conveyor belt repeating transfer and standby modes; liftable spacing rods installed on both sides of the width of the conveyor belt for lifting each sheet material upward from the conveyor belt during the standby mode of the conveyor belt; a linear thermal cutting system for cutting the upward lifted material into a unit shaped-sheet; a computer for electrically controlling an elevated height of the spacing rods and a transfer speed of the conveyor belt and for controlling operations of the linear thermal cutting system in respective axis directions based on cutting operation data; and a prototyping jig for fixing the unit shaped-sheets to form a predetermined shape in such a manner that one sides of the respective unit shaped-sheets are bonded to and laminated on the other sides of other unit shaped-sheets that geometrically correspond thereto.

Further, an intermittent material feed type variable-lamination rapid prototyping process using a linear thermal cutting system is provided that includes the steps of modeling a product using a 3-dimensional computer aided design (CAD) program in a computer, slicing the modeled product into a plurality of sheets using a program for automatically generating cutting paths, obtaining intermediate sections by restoring a profile of the modeled product and then slicing again the modeled product, and generating cutting operation data based on unit shape data produced from the intermediate sections; intermittently feeding sheet materials supported by a collapsible leg onto a conveyor belt by controlling a feeding speed of a friction roller engaged with the conveyor belt through a gear; lifting each sheet material upward from the conveyor belt in parallel with respect to the ground by shutting off electric power to the conveyor belt for transferring the material to stop the transfer of the material and by raising spacing rods; cutting the materials into unit shaped-sheets based on the cutting operation data by controlling operations of the linear thermal cutting system in respective axis directions using a computer; and prototyping a product by sequentially laminating the unit shaped-sheets onto a prototyping jig while bonding one sides of the unit shaped-sheets to the other sides of the other unit shaped-sheets that geometrically correspond thereto.

Here, each sheet material is formed with a plurality of spacing holes at marginal regions thereof so that the spacing rods are fitted into the respective spacing holes to lift the sheet material upward from the conveyor belt.

Preferably, each sheet material has a laminating hole formed in periphery region thereof so that a laminating rod of the prototyping jig can be fitted into the laminating hole in order to secure the unit shaped-sheet in a laminated position.

Further, it is preferred that the linear thermal cutting system includes a rotatable main spindle, a pivotable rod hingedly connected with and pivotable on one end of the main spindle, a pair of translating rods, and a hot wire and wherein one end of said translating rods are respectively linked with each end portion of the pivotable rod and the hot wire is installed between the other ends of the translating rods.

The hot wire is preferably a wire material for radiating electric resistance heat resulting from an electric current applied thereto, or one selected from a group consisting of a $CO_2$ laser and a ruby laser for use in a cutting operation.

Preferably, the laminating rod consists of a plurality of unit pieces, and each piece has one end with female threads formed therein and the other end with complementary male threads formed thereabout so that the pieces can be fastened to one another.

BRIEF DESCRIPTION OF THE SEVERAL VIEWS OF THE DRAWINGS

The above and other objects, advantages and features of the present invention will become apparent from the following description of preferred embodiments given in conjunction with the accompanying drawings, in which.

DETAILED DESCRIPTION OF THE INVENTION

Hereinafter, an intermittent material feed type variable-lamination rapid prototyping process and apparatus using a linear thermal cutting system according to the present invention will be explained in detail with reference to the accompanying drawings.

Figure 1:
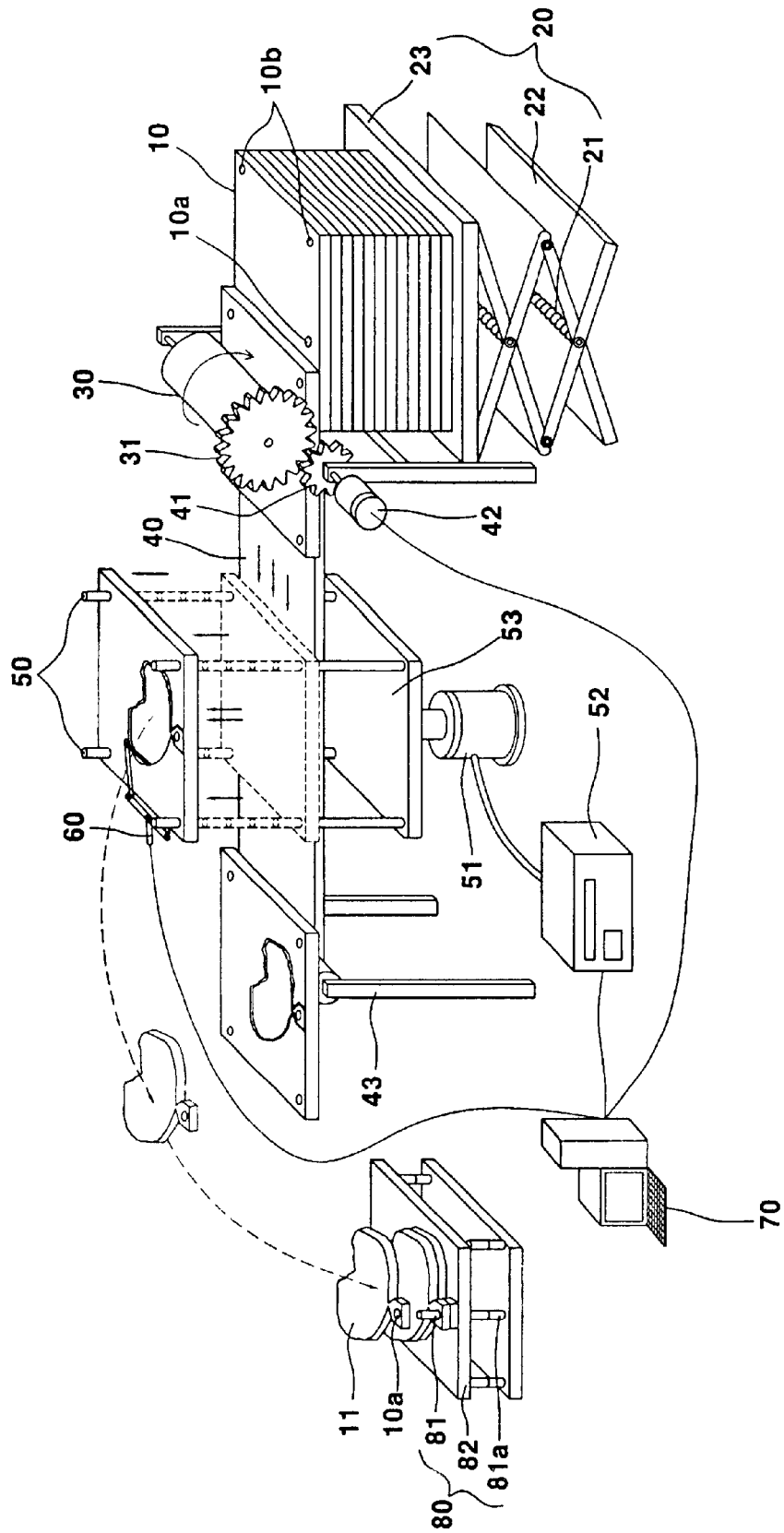
FIG. 1 is a perspective view showing the constitution of an intermittent material feed type variable-lamination rapid prototyping apparatus using a linear thermal cutting system according to the present invention.
Figure 2:
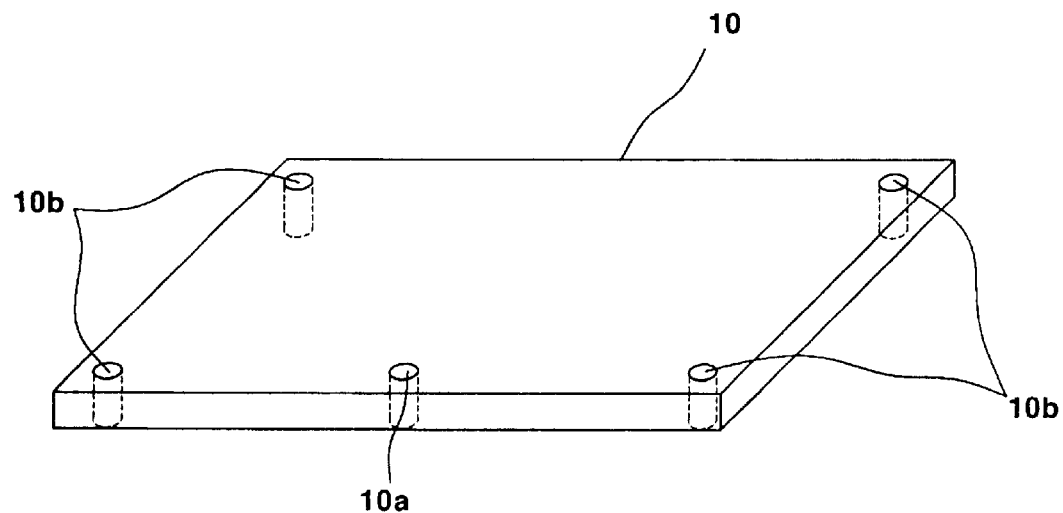
FIG. 2 is a conceptual view of a sheet material according to the present invention.

FIG. 1 is a perspective view showing the constitution of an intermittent material feed type variable-lamination rapid prototyping apparatus using a linear thermal cutting system according to the present invention; and FIG. 2 is a conceptual view of a material according to the present invention.

As shown in FIGS. 1 and 2, an intermittent material feed type variable-lamination rapid prototyping apparatus 100 comprises a collapsible leg 20 and a friction roller 30 for feeding a sheet material 10, a conveyor belt 40 for transferring the sheet material 10, a linear thermal cutting system 60 for processing the sheet material 10, and a prototyping jig 80 for manufacturing a product.

Driving speeds of the friction roller 30 and the conveyor belt 40 and operations of the linear thermal cutting system 60 in respective axis directions can be controlled by a computer 70 electrically connected with them.

The collapsible leg 20 includes a plurality of pivotable plates 22 connected with one another through linkage at their intersections, and elastic bodies 21 mounted at the intersections for serving to absorb a shock.

The top of the collapsible leg 20 is provided with a supporting plate 23 that is also connected through the linkage with the pivotable plates. A plurality of sheet materials 10 are stacked on the supporting plate 23.

Further, a driven gear 31 attached to one end of the friction roller 30 is rotated in engagement with a driving gear 41 of the conveyor belt 40. The driving gear 41 is connected with a direct current motor 42 of which a driving speed and supplied electric power are controlled by the computer 70.

At this time, the friction roller 30 faces the collapsible leg 20 with the stacked sheet materials 10 interposed therebetween and comes into close contact with a surface of an uppermost one of the stacked sheet materials 10 by means of upward elastic force of the elastic bodies 21 mounted in the leg 20.

Therefore, the uppermost one of the sheet materials 10 that is in close contact with the friction roller 30 can be intermittently fed onto the conveyor belt 40 in accordance with a rotational direction of the friction roller 30.

Moreover, the conveyor belt 40 transfers the sheet material 10 fed by the friction roller 30 from one side of the conveyor belt to the other side thereof, and is supported by two pairs of supports 43 for ensuring stable driving of the conveyor belt 40. The conveyor belt 40 repeatedly takes each temporary standby (stop) state for cutting the sheet material 10 during the operation of the conveyor belt 40.

Two pairs of spacing rods 50 are installed widthwise on both sides of the conveyor belt 40 in a state where each pair of spacing rods is disposed on one of the sides thereof. The spacing rods 50 can cause the sheet material 10 to be lifted upward and in parallel with the ground from the conveyor belt 40 by means of a spacing plate 53 to which lower ends of the spacing rods 50 are vertically fixed and a hydraulic cylinder 51 for lifting and lowering the spacing plate 53 in parallel with the ground.

At this time, the hydraulic cylinder 51 receives hydraulic pressure from a hydraulic pressure supply and regulator 52 connected with one side thereof, and the hydraulic supply adjuster 52 is electrically connected with the computer 70 which in turn can control whether the hydraulic pressure is supplied by the hydraulic supply adjuster 52.

When the sheet material 10 transferred by the conveyor belt 40 reaches a position where the spacing rods 50 are installed, the computer 70 shuts off the electric power, which is supplied to the direct current motor 42 of the conveyor belt 40, through an onboard inverter (not shown) in the computer 70 so that the sheet material 10 can be in the standby state.

Then, the sheet material 10 is lifted upward from the conveyor belt by means of the spacing plate 53 and the spacing rods 50 lifted by the hydraulic cylinder 51.

The lifted sheet material 10 is processed using the linear thermal cutting system 60 which can cut the material while controlling processing parameters, such as a processing length and width, a lateral gradient, a cutting speed, and a hot wire temperature, during the processing based on cutting operation data generated in the computer 70.

The computer 70 is operated based on a Windows operating system and can beforehand perform modeling of a product to be manufactured later by executing a 3-dimensional CAD program installed therein and then perform a slicing operation for slicing the modeled product into a plurality of sheets.

Through such operations, the computer 70 generates the cutting operation data by which movements of the linear thermal cutting system 60 in the respective axis directions can be controlled, and causes the linear thermal cutting system 60 to perform a more precise cutting operation.

Meanwhile, the sheet material 10 is cut into a unit shaped-sheet 11 by the linear thermal cutting system 60 operated in such a way. A predetermined amount of adhesive is applied to one side of the unit shaped-sheet 11 which in turn is bonded to and laminated on the other side of another unit shaped-sheet that geometrically corresponds thereto.

At this time, the bonding and laminating of the unit shaped-sheets 11 are performed on the prototyping jig 80 so that a single product can be prototyped. The prototyping jig 80 includes two partitions 82 constructing a two-story structure, and a laminating rod 81 vertically coupled with the partitions 82.

The laminating rod 81 can be broken into a plurality of unit pieces 81a. Each piece 81a has one end with female threads formed therein, and the other end with complementary male threads formed thereabout. Thus, the pieces 81a can be fastened to one another. Accordingly, the height of the laminating rod 81 can be adjusted. As a result of continuous fastening of the unit pieces 81a, products can be prototyped regardless of the quantity of unit shaped-sheets 11.

Moreover, as shown in FIG. 2, the sheet material 10 includes one laminating hole 10a which is included in the processed unit shaped-sheet 11 but is located out of the processing range. The laminating hole 10a can be fitted over the laminating rod 81 so that the unit shaped-sheet 11 to be laminated on the prototyping jig 80 can remain in place and thus maintain the shape of the product.

Furthermore, the sheet material 10 is formed with four spacing holes 10b placed at respective ones of four corners of the sheet material 10 in addition to the laminating hole 10a. Since the diameter of each of the spacing rods 50 is increased toward a lower end thereof, the spacing rods 50 are fitted into the respective spacing holes 10 with predetermined gap so that a processing position of the sheet material 10 can be fixed.

Figure 3:
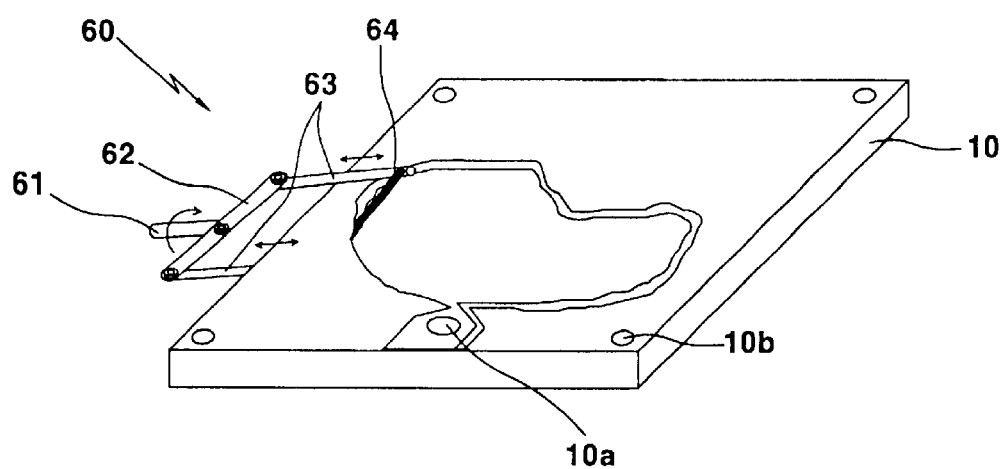
FIG. 3 is a conceptual view of the sheet material processing using the linear thermal cutting system according to the present invention.
Figure 4:
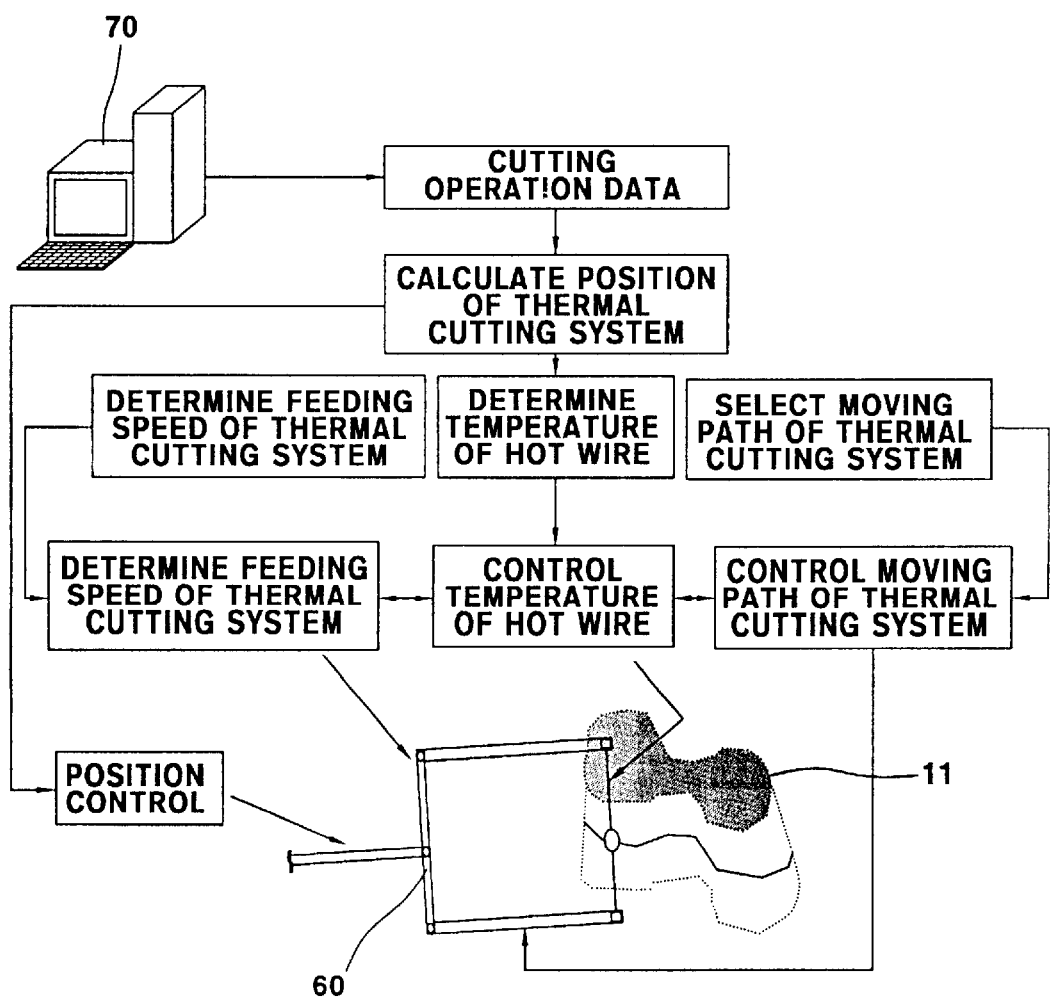
FIG. 4 is a block diagram illustrating the control process of the linear thermal cutting system according to the present invention.

FIG. 3 is a conceptual view of the material processing using the linear thermal cutting system according to the present invention, and FIG. 4 is a block diagram illustrating the control process of the linear thermal cutting system according to the present invention.

As shown in FIGS. 3 and 4, the linear thermal cutting system 60 includes a main spindle 61, a pivotable rod 62 hingedly connected with one end of the main spindle 61, a pair of translating rods 63 of which one ends are linked with both ends of the pivotable rod 62, and a hot wire 64 connected between the other ends of the translating rods 63.

At this time, the main spindle 61 can rotate 360° in a clockwise or counterclockwise direction. The pivotable rod 62 hingedly connected with the main spindle 61 is pivotable on a hingedly connected portion of the pivotable rod. The pivoting angle of the pivotable rod is about −65° to +65° with respect to a vertical plane in which the main spindle 61 is included.

Furthermore, the pair of translating rods 63 which are linked with both the ends of the pivotable rod 62 can be translated in forward and backward directions according to the pivoting movement of the pivotable rod 62.

The hot wire 64 disposed between the translating rods 63 can cut the sheet material 10 into the unit shaped-sheet 11. The hot wire 64 may be a wire material for radiating electric resistance heat resulting from an electric current applied thereto, or may be replaced by a cutting laser that is widely used for a cutting operation, such as a $CO_2$ laser or ruby laser.

The linear thermal cutting system 60 constructed as such is a 4-axis operation control type in which the operations in the respective axis directions can be controlled based on the cutting operation data generated by the CAD program installed in the computer 70. The temperature of the hot wire 64 can also be controlled based on physical properties of the sheet material 10 to be processed.

Hereinafter, an intermittent material feed type variable-lamination rapid prototyping process using the linear thermal cutting system according to the present invention will be explained with reference to the accompanying drawings.

Figure 5:
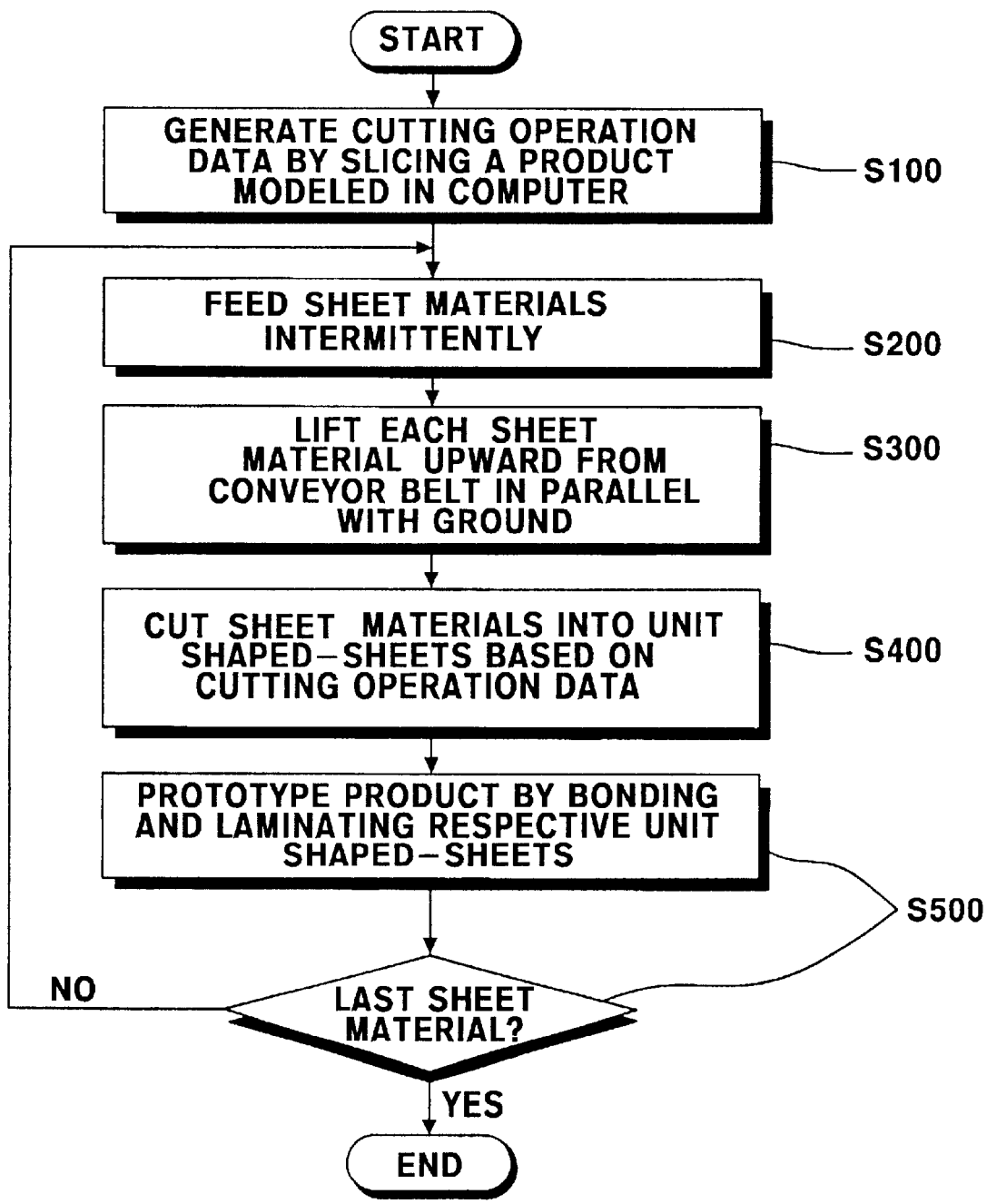
FIG. 5 is a flowchart illustrating an intermittent material feed type variable-lamination rapid prototyping process using the linear thermal cutting system according to the present invention.

FIG. 5 is a flowchart illustrating the intermittent material feed type variable-lamination rapid prototyping process using the linear thermal cutting system according to the present invention.

As shown in FIG. 5, the prototyping process generally comprises five steps. The respective steps of the process will be described below.

The computer 70 operated based on the Windows operating system generates the cutting operation data which control the cutting operation, after performing the modeling of the product. More specifically, the computer 70 performs the modeling of the product by using the 3-dimensional CAD program and performs the slicing operation for beforehand slicing the product to be prototyped into the plurality of sheets by executing a program for automatically generating cutting paths, which is installed in the computer.

Further, after a profile of the product to be prototyped is restored, the product is sliced again to obtain intermediate sections. Then, the cutting operation data are finally generated based on unit shape data produced from the intermediate sections (S100).

Subsequently, a feeding speed of the friction roller 30 that rotates in engagement with the driving gear 41 of the conveyor belt 40 is controlled so that the sheet materials 10 supported by the collapsible leg 20 are intermittently fed onto the conveyor belt 40.

At this time, the collapsible leg 20 supports and raises the plurality of sheet materials 10 stacked thereon by the elastic bodies 21 disposed at the intersections of the pivotable plates 22, so that each of the sheet materials 10 is caused to come into close contact with the friction roller 30. Thus, the rotation of the friction roller 30 causes the materials 10 to be fed onto the conveyor belt 40 one by one (S200).

Thereafter, the sheet material 10 transferred by the conveyer belt is stopped and remains in the standby state by shutting off the electric power to the conveyor belt 40. Then, the sheet material 10 is lifted upward from the conveyor belt in parallel with the ground by lifting the spacing rods 50.

Here, since the sheet material 10 is formed with the spacing holes 10b corresponding to the spacing rods 50, the spacing rods 50 are lifted and then fitted into the respective spacing holes 10b.

At this time, since the diameters of the spacing rods 50 are increased toward the lower ends thereof, the spacing rods 50 are fitted into the spacing holes 10b not to fully penetrate therethrough so that the upward spaced material 10 can be caught by and fixed around the spacing rods (S300).

The upward lifted material 10 is cut by the linear thermal cutting system 60 of which the operations in the respective axis directions are controlled based on the cutting operation data generated in the computer 70.

As described above, the linear thermal cutting system 60 is a 4-axis control type link mechanism in which the pivotable rod 62 is connected with the one end of the rotatable main spindle 61, the pair of translating rods 63 are linked with both the ends of the pivotable rod 62, and the hot wire 64 is provided between the translating rods 63.

The hot wire 64 is a kind of wire material for radiating the electric resistance heat resulting from an electric current applied thereto, or the $CO_2$ laser or ruby laser for use in a cutting operation. Such a hot wire 64 can cut the sheet material 10 into the unit shaped-sheet 11 through the interlocked operations in the respective axis directions (S400).

Then, the adhesive is applied to one sides of the unit shaped-sheets 11 subjected to the cutting operation, which in turn are bonded to the other sides of other unit shaped-sheets that geometrically correspond thereto. The product can be prototyped by sequentially laminating the unit shaped-sheets 11 on the prototyping jig 80 in such a way.

At this time, the laminating rod 81 formed on the prototyping jig 80 is fitted into the laminating holes 10a formed in the respective unit shaped-sheets 11 so that the shape of the prototyped product can be correctly maintained (S500).

In the prototyping apparatus 100 constructed as such, an electric motor may be substituted for the hydraulic cylinder 51.

Further, the hot wire 64 may be any one selected among high-temperature plasma, heat gas and a heat beam, in addition to the wire material for radiating the electric resistance heat resulting from the electric current applied thereto, or the $CO_2$ laser or ruby laser for use in a cutting operation.

According to the aforementioned intermittent material feed type variable-lamination rapid prototyping process and apparatus using the linear thermal cutting system of the present invention, the intermittent and sequential feed of the materials and the cutting operation of the materials can be controlled by the computer. Consequently, there is an advantage in that the operation time can be relatively shortened and thus workability can be improved.

Further, the operations of the linear thermal cutting system in the respective axis directions are controlled by the computer on the basis of the cutting operation data in order to cause the processing parameters such as the processing length and width and the gradient to be controlled during the processing. Therefore, there is an advantage in that more precise processing can be achieved.

Moreover, since there is no need for a post treatment for the processed unit shaped-sheets, additionally required operation time can be shortened.

Particularly, since a complex 3-dimensional shape that cannot be manufactured by a 3- or 5-axis cutting operation can be manufactured in a relatively short period of time, there is an advantage in that the prototyping process and apparatus according to the present invention can be adapted to manufacture of commercial characters as well as various kinds of industrial or engineering parts.

Although the present invention has been described in connection with the preferred embodiment, it will be understood by those skilled in the art that various changes and modifications may be made thereto without departing from the spirit and scope of the invention. Therefore, the appended claims are construed as covering such changes and modifications falling within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An intermittent material feed type variable-lamination rapid prototyping apparatus using a linear thermal cutting system, comprising:

a collapsible leg with elastic bodies installed at link-connected intersections for supporting sheet materials stacked on the collapsible leg;

a friction roller for feeding the supported materials onto a conveyor belt engaged with and simultaneously driven with the friction roller through gears in a state where the friction roller is in pressure contact with one of the sheet materials, said conveyor belt configured to repeat a transfer mode and a standby mode;

liftable spacing rods installed on both sides of the width of the conveyor belt for lifting each sheet material upward from the conveyor belt during the standby mode of the conveyor belt;

a linear thermal cutting system for cutting the upward lifted material into a unit shaped-sheet;

a computer for electrically controlling an elevated height of the spacing rods and a transfer speed of the conveyor belt and for controlling operations of the linear thermal cutting system in respective axis directions based on cutting operation data; and a prototyping jig for fixing the unit shaped-sheets to form a predetermined shape in such a manner that one sides of the respective unit shaped-sheets are bonded to and laminated on the other sides of other unit shaped-sheets that geometrically correspond thereto.

2. The apparatus as claimed in claim 1, wherein each sheet material is formed with a plurality of spacing holes at marginal regions thereof so that the spacing rods are fitted into the respective spacing holes to lift the sheet material upward from the conveyor belt.

3. The apparatus as claimed in claim 1, wherein each sheet material has a laminating hole formed in periphery region thereof so that a laminating rod of the prototyping jig can be fitted into the laminating hole in order to secure the unit shaped-sheet in a laminated position.

4. The apparatus as claimed in claim 1, wherein the linear thermal cutting system includes a rotatable main spindle, a pivotable rod hingedly connected with and pivotable on one end of the main spindle, a pair of translating rods, and a hot wire and wherein one end of said translating rods are respectively linked with each end portion of the pivotable rod and the hot wire is installed between the other ends of the translating rods.

5. The apparatus of claim 4, wherein the hot wire is a wire material for radiating electric resistance heat resulting from an electric current applied thereto.

6. The apparatus of claim 4, wherein the hot wire is one selected from a group consisting of a $CO_2$ laser and a ruby laser for use in a cutting operation.

7. The apparatus of claim 3, wherein the laminating rod consists of a plurality of unit pieces, and each piece has one end with female threads formed therein and the other end with complementary male threads formed thereabout so that the pieces can be fastened to one another.

8. An intermittent material feed type variable-lamination rapid prototyping process using a linear thermal cutting system, comprising the steps of:

modeling a product using a 3-dimensional computer aided design (CAD) program in a computer, slicing the modeled product into a plurality of sheets using a program for automatically generating cutting paths, obtaining intermediate sections by restoring a profile of the modeled product and then slicing again the modeled product, and generating cutting operation data based on unit shape data produced from the intermediate sections;

intermittently feeding sheet materials supported by a collapsible leg onto a conveyor belt by controlling a feeding speed of a friction roller engaged with the conveyor belt through a gear;

lifting each sheet material upward from the conveyor belt in parallel with respect to the ground by shutting off electric power to the conveyor belt for transferring the material to stop the transfer of the material and by raising spacing rods;

cutting the materials into unit shaped-sheets based on the cutting operation data by controlling operations of the linear thermal cutting system in respective axis directions using a computer; and prototyping a product by sequentially laminating the unit shaped-sheets onto a prototyping jig while bonding one sides of the unit shaped-sheets to the other sides of the other unit shaped-sheets that geometrically correspond thereto.

9. The process of claim 8, wherein each sheet material is formed with a plurality of spacing holes at marginal regions thereof so that the spacing rods are fitted into the respective spacing holes to lift the sheet material upward from the conveyor belt.

10. The process of claim 8, wherein each sheet material has a laminating hole formed in periphery region thereof so that a laminating rod of the prototyping jig can be fitted into the laminating hole in order to secure the unit shaped-sheet in a laminated position.

11. The process of claim 8, wherein the linear thermal cutting system includes a rotatable main spindle, a pivotable rod hingedly connected with and pivotable on one end of the main spindle, a pair of translating rods, and a hot wire and wherein one end of said translating rods are respectively linked with each end portion of the pivotable rod and the hot wire is installed between the other ends of the translating rods.

12. The process of claim 11, wherein the hot wire is a wire material for radiating electric resistance heat resulting from an electric current applied thereto.

13. The process of claim 11, wherein the hot wire is one selected from a group consisting of a $CO_2$ laser and a ruby laser for use in a cutting operation.

14. The process of claim 10, wherein the laminating rod consists of a plurality of unit pieces, and each piece has one end with female threads formed therein and the other end with complementary male threads formed thereabout so that the pieces can be fastened to one another.

* * * * *